Sept. 28, 1937. H. L. CLEMENT 2,094,446
BREAD SALVER
Filed Dec. 15, 1934
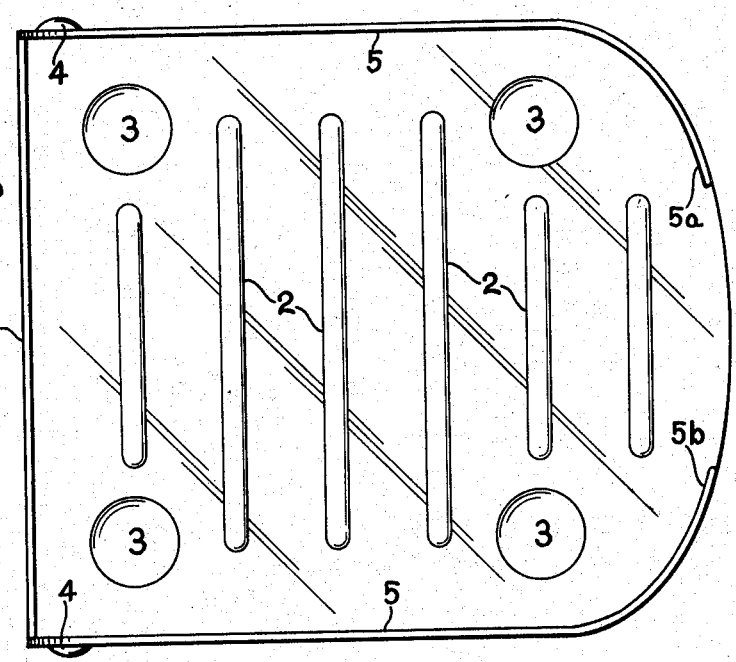
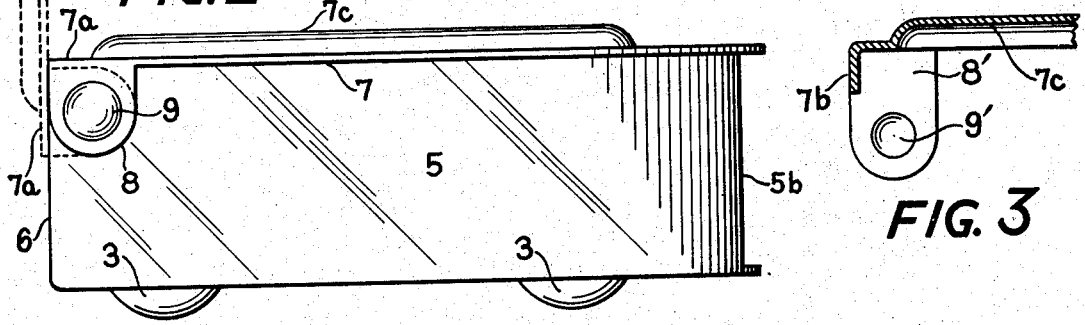
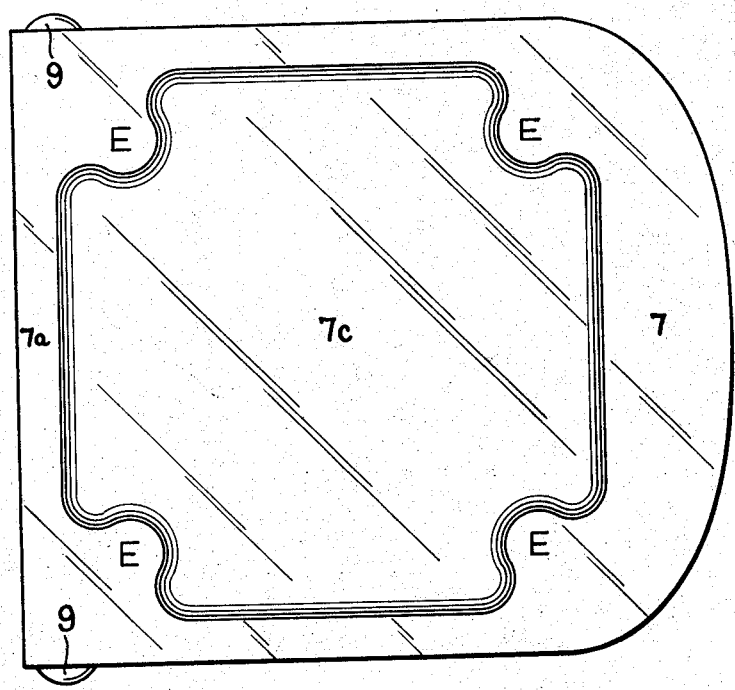
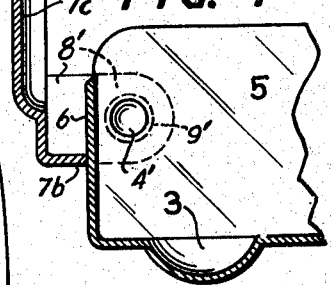
INVENTOR
Helen Louise Clement Patented Sept. 28, 1937

2,094,446

UNITED STATES PATENT OFFICE 2,094,446

BREAD SALVER

Helen Louise Clement, Spokane, Wash.

Application December 15, 1934, Serial No. 757,646

9 Claims. (Cl. 65—60)

The present invention relates to an improved bread salver or holder for an individual portion of sliced bread or toast at the dining table.

In carrying out my invention, I provide a receptacle of appropriate shape and size, having a hinged lid or cover, to preclude undue loss of the moisture content of the sliced bread or toast served therein.

The contents of the receptacle are supported upon relief ribs to minimize the extent of contact of the contents with the receptacle.

The cover is preferably provided with bead and socket pivot hinges, whereby it may with facility be detached for convenience in cleansing.

The receptacle is preferably supported upon bead legs; and complementary thereto, socket recesses may be provided on the lid or cover, whereby the bead legs of one receptacle will engage with the recesses on the top of another, thereby enabling several receptacles to be stacked in uniform relation, secure against disarrangement when carried, which is advantageous in restaurant practice.

By the utilization and employment of the device of my invention sliced bread may be served at the table in either the home or restaurant, free from the unpalatableness of dried out bread, as will usually occur in arid climates, summer heat, low humidity or artificial ventilation, one or the other of which periodically occur with the seasons in most localities.

The invention consists of certain novel structures, combinations and arrangements of parts as will hereinafter be more fully set forth and claimed. It will be understood that the invention is not restricted to the exact embodiment herein illustrated and described, but that modifications may be made in the disclosed structure without departing from the principles of the invention and the intent of the claims. The accompanying drawing illustrates the physical embodiment of my invention.

Figure 1 is a side elevation of the preferred form of my invention.

Figure 2 is a plan view of the interior and discloses the supporting ribs.

Figure 3 is a fragmentary view, partly in section, showing a modified lid or cover with the hinge axis displaced downward to accommodate a skirt member.

Figure 4 is a fragmentary view, partly in section, showing the modified lid in open position on the receptacle proper.

Figure 5 is a top plan view disclosing the means for engaging the stacked receptacles in uniform relation.

When sliced bread is served uncovered in either unusual warmth, low humidity, or continuous air current it dries out rapidly, and consequently becomes unpalatable. Under either of the aforementioned conditions, sliced bread will become objectionably dry in less time than is required to eat the usual meal.

In carrying out my invention I provide a convenient and attractive way of serving sliced bread, sandwiches, or toast, at the table without the otherwise dryness resulting from the aforementioned causes under the same atmospheric conditions.

The device may be of a rectangular shape, of suitable size and depth, provided with a suitably hinged cover, and it may be supported on short legs either in a vertical or in a horizontal position.

Preferably, the device is of the shape and size comparable to the usual slice of bread, as is illustrated in Figure 2. In this figure, it will be seen that the major contacting surface is provided with a number of ribs 2, which are preferably fashioned as reliefs or corrugations made by indenting the opposite side of the material, which is preferably of sheet metal. These ribs serve as supports for the contents of the receptacle, thereby restricting the contact between the contents and the receptacle as is advisable in case the bread or toast is provided with a spread, such as butter. These ribs also add to the rigidity of the material and permit the use of thinner material in the manufacture of the device. As shown in this figure, the bead legs 3 are preferably formed by indentations on the inner side of the receptacle, which of course results in protuberances on the outer or under surface, and beads 4 for the hinges are preferably fashioned in a similar manner.

The side walls 5 and 5 may be continuous and enclose the front, or they may terminate at 5a and 5b, leaving an aperture of appropriate size to facilitate removal of the contents when the cover is hinged sufficiently. The elements 5a and 5b, effectively prevent accidental discharge of the contents when the receptacle is being carried to the table.

As shown in Figure 1, the cover 7 is preferably provided with downward projections 8 which are paired and disposed at the rear of the opposite sides and each projection, or ear, is provided with a socket 9 complementary to the aforementioned beads 4 and 4, whereby a pair of pivot joints is provided as hinges for the cover or lid 7.

As shown in Figure 4, the upper rear corner of each side wall 5, is appropriately rounded to permit of the required movement of the hinged cover. Preferably, the beads 4, and the sockets 9 are positioned so as to limit the hinging of the cover through an arc of ninety degrees, such limitation being accomplished by the portion 7a of the cover, impinging against the back wall 6, of the receptacle as indicated by the dotted outline in Figure 1.

Obviously, the aforementioned rounding of the upper rear corners as shown in Figure 4, also necessitates a reduction in the rear wall 6 as shown in this figure. Although a completely closed container is not necessary for the required purposes, I may close the space between the back wall 6 and the portion 7a of the cover by employing a skirt 7b, as is shown in Figure 3, in which case the aforementioned beads 4 and sockets 9 will be positioned sufficiently lower to permit of the required clearance between the skirt 7b and the rear wall 6 and at the same time cause the skirt 7b, to impinge against the rear wall 6 when the lid or cover is hinged through an arc of ninety degrees, as is shown in Figure 4 where like numerals are primed. The advantage of limiting the opening of the cover or lid to vertical position, is that less room is required on the table and furthermore the receptacle may be filled with greater facility when the opened lid is in vertical position and within easy grasp, than when otherwise more remote in opened horizontal position, these details being of advantage in restaurant service.

The lid or cover is preferably provided with a relief 7c of any desirable shape and size, this being fashioned by indenting the underside thereof, thereby enhancing the rigidity and permitting of the use of thinner material in the manufacture of the device. Furthermore, this relief and the aforementioned ribs 2, preclude, too close confinement of the contents, which would otherwise result in sweating, in the case of hot toast.

For restaurant use, it is of advantage to provide means for stacking several devices. Figure 5, shows an improved structure which provides means for stacking several in uniform relation one to the others. As shown in this figure, the relief portion 7c is indented at E, E, E and E. These indentations and the bead legs 3, 3, 3 and 3, are similarly spaced and are similar in contour, size and depth. It will be readily understood that the beaded legs of one receptacle, may with facility be engaged with the indentations or recesses on the lid or top of another and that when so engaged, the receptacles are held in uniform relation one to the other. Due to this novel structure and arrangement of the parts, the individual bread service for the usual four persons at a restaurant table, may with facility be stacked one upon the other and carried with ease, requiring but a minimum of space on the customary service tray, or other means of carrying. As will be seen in this figure, the described indentations or recesses add to the ornate appearance of the cover or lid and are both useful and ornamental.

The device may be of an appropriate depth to hold say three slices of bread as indicated in Figure 1, or it may hold, say four slices. Suitable modifications may be employed and the device vertically disposed.

It will be readily understood that the present invention provides a practical and satisfactory means of serving bread, sandwiches, toast, or the like, without the unpalatableness attendant dehydration, which normally occurs in unusual warmth, low humidity or continuous air currents, either of which conditions, periodically occur in most localities. Of course the novel mode of service is appealing to the esthetic nature and in localities where dust storms are experienced, the added advantage is obvious.

The mode of employing the device is too obvious to require description. However, it should be pointed out, that almost any number of the devices can readily be stacked upon the usual serving shelf without relative disarrangement, which is of course preferable for restaurant convenience. From four to six can with facility be carried in the hand or upon a tray, which of course is a greater aptitude than is possible with the usual bread plate.

In the invention herein disclosed, what I claim as new and desire to secure by Letters Patent of the United States is:

1. A receptacle for serving an individual portion of sliced bread or the like, a cover for the same, paired ears depending perpendicular from said cover, a web depending perpendicular from said cover and connecting said paired ears, said receptacle pivotably connected to said paired ears, the pivotal axis being disposed downward and forward sufficient to cause the edge of said web to impinge the rear wall of said receptacle when the cover is opened to vertical position, the rear wall of said receptacle being of less height than the side walls thereof and said web adapted to complete said rear wall when the cover is closed.

2. A receptacle for serving an individual portion of sliced bread or the like, a cover for the same, the underside of said cover embodying a recess surrounded by a plane marginal portion sufficing to preclude entrance of sliced bread into said recess, paired ears pendent from said marginal portion, a skirt pendent from said marginal portion and forming a web connecting said paired ears, complementary engaging beads and sockets on said container and said paired ears for detachably pivoting said cover upon said container, the pivotal axis of said bead and socket members disposed downward and forward sufficient to cause the edge of said skirt to impinge the rear wall of said receptacle when the cover is opened to vertical position, the rear wall of said receptacle being of less height than the side walls thereof and said skirt adapted to complete said rear wall when the cover is closed.

3. A receptacle for serving an individual portion of sliced bread or the like, a cover for the same, the underside of said cover embodying a recess surrounded by a plane marginal portion to preclude entrance of sliced bread into said recess, paired ears pendent from said plane marginal portion, complementary engaging beads and sockets on said container and said paired ears for detachably pivoting said cover upon said container, the pivotal axis of said bead and socket members disposed downward and forward an equal amount sufficient to cause the plane marginal portion of said cover to impinge the rear wall of said receptacle when the cover is opened to vertical position.

4. A receptacle for serving an individual portion of sliced bread or the like and having the front wall thereof scarped sufficiently to expose all of the slices contained therein to no more than thumb and finger grasp, a number of relief ribs in the bottom thereof, a number of protuberances on the underside thereof for supporting the same upon a contacting surface, the opposite side walls thereof being rearwardly provided with pivot means, a detachable lid having pivot means complementary thereto, said pivot means disposed so as to cause said lid to impinge the rear wall of said receptacle when opened to vertical position, a recess on the underside of said lid, a corresponding relief upon the upper side of said lid, a plane marginal portion surrounding said relief, indented recesses in the edges of said relief, said indented recesses being adapted to engage the aforementioned protuberances when one receptacle is placed in relative position upon another and thereby hold said relative position against disarrangement.

5. A receptacle for serving an individual portion of sliced bread or the like, a number of protuberances on the underside thereof for supporting the same upon a contacting surface, a hinged cover therefor, the major portion of the underside of said cover being recessed, a corresponding relief portion upon the upper side of said cover, a plane marginal portion surrounding said relief portion, indented recesses in the edges of said relief portion, said indented recesses adapted to engage said protuberances when one receptacle is placed in relative position upon another and thereby hold said relative position against disarrangement, the front wall of said receptacle being scarped sufficiently to expose all of the slices contained therein to no more than thumb and finger grasp and to provide for raising a single slice of contents against the cover to partially open the same sufficiently to remove a single slice, thereby to preclude undue loss of moisture from the recess in the cover.

6. A receptacle for serving an individual portion of sliced bread or the like, comprising a retaining portion, a number of protuberances on the underside thereof for supporting the same upon a contacting surface, a cover, paired ears depending perpendicular from the opposite rear corners of said cover, complementary engaging bead and socket members on said ears and said retaining portion for detachably hinging said cover, the major portion of the underside of said cover being recessed, a corresponding relief portion upon the exterior of said cover, a plane marginal portion surrounding said relief portion, indented recesses in the edges of said relief portion, said indented recesses adapted to engage said protuberances when one receptacle is placed in relative position upon another and thereby hold said relative position against disarrangement, the underside of said plane marginal portion sufficing to preclude sliced bread contained in said receptacle from entering the recess on the underside of said cover.

7. A receptacle for serving an individual portion of sliced bread or the like, comprising a retaining portion, a number of protuberances on the underside thereof for supporting the same upon a contacting surface, a cover engaging said retaining portion, the major portion of the underside of said cover being recessed, a corresponding relief portion upon the upper side of said cover, a plane marginal portion surrounding said relief portion, indented recesses in the edges of said relief portion, said indented recesses adapted to engage said protuberances when one receptacle is placed in relative position upon another and thereby hold said relative position against disarrangement, the underside of said plane marginal portion sufficing to preclude sliced bread contained in said receptacle from entering the recess on the underside of said cover.

8. A receptacle for serving an individual portion of sliced bread or the like, comprising a retaining portion, at least three relief ribs in the bottom of said retaining portion, a hinged cover for said retaining portion, the major portion of the underside of said cover being recessed, a corresponding relief portion upon the exterior of said cover, a plane marginal portion surrounding said relief portion, said relief ribs and said plane marginal portion sufficing to prevent extended contact of sliced bread with the bottom and top of the receptacle, the front wall of said receptacle scarped sufficiently to expose all of the slices contained therein to no more than thumb and finger grasp to provide for raising a single slice of contents against the cover to partially open the same sufficiently to remove a single slice, thereby to preclude undue loss of moisture from the recess in the cover.

9. A receptacle for serving an individual portion of sliced bread or the like, a hinged cover therefor, the underside of said cover provided with a recess for retaining the moisture emitted from the contents of the receptacle, the front wall of said receptacle scarped sufficiently to expose all of the slices contained therein to no more than thumb and finger grasp to provide for raising a single slice of contents against the cover to partially open the same sufficiently to remove a single slice, thereby to preclude undue loss of moisture from the recess of the cover.

HELEN LOUISE CLEMENT.